United States Patent
Ding et al.

(10) Patent No.: US 11,425,309 B2
(45) Date of Patent: Aug. 23, 2022

(54) IMAGE CAPTURE METHOD AND APPARATUS

(71) Applicant: Huawei Technologies Co., Ltd., Shenzhen (CN)

(72) Inventors: Xin Ding, Beijing (CN); Chen Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 16/615,269

(22) PCT Filed: Jun. 9, 2017

(86) PCT No.: PCT/CN2017/087803
§ 371 (c)(1),
(2) Date: Nov. 20, 2019

(87) PCT Pub. No.: WO2018/223394
PCT Pub. Date: Dec. 13, 2018

(65) Prior Publication Data
US 2020/0169657 A1    May 28, 2020

(51) Int. Cl.
*H04N 5/235* (2006.01)
*G06T 7/12* (2017.01)
(Continued)

(52) U.S. Cl.
CPC ............ *H04N 5/2353* (2013.01); *G06T 7/12* (2017.01); *G06T 7/13* (2017.01); *H04N 5/2351* (2013.01); *H04N 5/232935* (2018.08)

(58) Field of Classification Search
CPC ......... G06T 7/12; G06T 7/13; H04N 5/23222; H04N 5/232935; H04N 5/2351; H04N 5/235; H04N 5/2353

(Continued)

(56) References Cited

U.S. PATENT DOCUMENTS 6,580,454 B1    6/2003  Perner et al.
10,567,638 B2   2/2020  Tsuchiya et al.
(Continued)

FOREIGN PATENT DOCUMENTS

CN    1953515 A      4/2007
CN    100414969 C    8/2008
(Continued)

OTHER PUBLICATIONS

Machine translation of JP-2007079454-A (Year: 2007).*
(Continued)

*Primary Examiner* — Christopher S Kelley
*Assistant Examiner* — Ana Picon-Feliciano
(74) *Attorney, Agent, or Firm* — Conley Rose, P.C.

(57) ABSTRACT

An image capture method and apparatus obtains a preview image in a capture preview window, segments the preview image into N image blocks based on N objects included in the preview image, where N is a positive integer, determines M image blocks whose definitions do not meet a preset definition criterion from the N image blocks, where M is a positive integer less than or equal to N, adjusts an exposure parameter of each of the M image blocks, outputs prompt information when the definitions of the M image blocks meet the preset definition criterion. Prompt information prompts a user to capture the image, receives a capture instruction from the user, and captures the preview image in the capture preview window based on an adjusted exposure parameter.

20 Claims, 3 Drawing Sheets

(51) Int. Cl.
*G06T 7/13* (2017.01)
*H04N 5/232* (2006.01)

(58) Field of Classification Search
USPC .................................................. 348/229.1
See application file for complete search history.

(56) References Cited

U.S. PATENT DOCUMENTS

| | | | |
|---|---|---|---|
| 2005/0046708 A1 | 3/2005 | Lim et al. | |
| 2008/0252791 A1 | 10/2008 | Mitsunaga | |
| 2010/0020221 A1 | 1/2010 | Tupman et al. | |
| 2012/0062754 A1 | 3/2012 | Huang | |
| 2012/0314124 A1 | 12/2012 | Kaizu et al. | |
| 2013/0076927 A1* | 3/2013 | Lee ................. | H04N 5/2354 348/216.1 |
| 2013/0182106 A1 | 7/2013 | Nakamichi et al. | |
| 2014/0321766 A1 | 10/2014 | Jo | |
| 2018/0097988 A1* | 4/2018 | Tsuchiya .......... | H04N 5/232935 |
| 2020/0077017 A1* | 3/2020 | Ji .................... | G06K 9/036 |

FOREIGN PATENT DOCUMENTS

| | | |
|---|---|---|
| CN | 100435562 C | 11/2008 |
| CN | 102131051 A | 7/2011 |
| CN | 102970488 A | 3/2013 |
| CN | 101442617 B | 1/2014 |
| CN | 103905711 A | 7/2014 |
| CN | 103957362 A | 7/2014 |
| CN | 103108158 B | 11/2015 |
| CN | 105323496 A | 2/2016 |
| CN | 105407276 A | 3/2016 |
| CN | 105574866 A | 5/2016 |
| CN | 105611186 A | 5/2016 |
| CN | 105933607 A | 9/2016 |
| CN | 106060422 A | 10/2016 |
| CN | 106131450 A | 11/2016 |
| EP | 2945366 A1 | 11/2015 |
| JP | H09159906 A | 6/1997 |
| JP | 2007079454 A | 3/2007 |
| JP | 2007079454 A * | 3/2007 |
| JP | 2008263475 A | 10/2008 |
| JP | 2013145441 A | 7/2013 |
| JP | 2016192606 A | 11/2016 |

OTHER PUBLICATIONS

Machine Translation and Abstract of Chinese Publication No. CN1953515, Apr. 25, 2007, 13 pages.
Machine Translation and Abstract of Chinese Publication No. CN100435562, Nov. 19, 2008, 16 pages.
Machine Translation and Abstract of Chinese Publication No. CN101442617, Jan. 8, 2014, 9 pages.
Machine Translation and Abstract of Chinese Publication No. CN102131051, Jul. 20, 2011, 7 pages.
Machine Translation and Abstract of Chinese Publication No. CN103108158, Nov. 18, 2015, 14 pages.
Machine Translation and Abstract of Chinese Publication No. CN103905711, Jul. 2, 2014, 9 pages.
Machine Translation and Abstract of Chinese Publication No. CN103957362, Jul. 30, 2014, 9 pages.
Machine Translation and Abstract of Chinese Publication No. CN105323496, Feb. 10, 2016, 25 pages.
Machine Translation and Abstract of Chinese Publication No. CN105407276, Mar. 16, 2016, 16 pages.
Machine Translation and Abstract of Chinese Publication No. CN105574866, May 11, 2016, 23 pages.
Machine Translation and Abstract of Chinese Publication No. CN105611186, May 25, 2016, 27 pages.
Machine Translation and Abstract of Chinese Publication No. CN105933607, Sep. 7, 2016, 34 pages.
Machine Translation and Abstract of Chinese Publication No. CN106060422, Oct. 26, 2016, 30 pages.
Machine Translation and Abstract of Chinese Publication No. CN106131450, Nov. 16, 2016, 28 pages.
Machine Translation and Abstract of Japanese Publication No. JPH09159906, Jun. 20, 1997, 22 pages.
Nayar, S., et al., "Adaptive Dynamic Range Imaging: Optical Control of Pixel Exposures Over Space and Time," Proceedings of the Ninth IEEE International Conference on Computer Vision (ICCV'03), IEEE 2003, 8 pages.
Qiu, X., "Photographing and Commenting on 30 Flagship Mobile Phones in 2016," Retrieved from:http://mobile.zol.com.cn/615/6155306_all.html, Dec. 2, 2016, 159 pages.
Anonymous, "Top of the country, Zuk Z2 Pro / OnePlus 3 / Huawei P9 / Xiaomi 5 take photos," Retrieved from: http://www.igao7.com/news/201608/4NIJUmQ9YzCdFaZe.html, Aug. 6, 2016, 55 pages.
Foreign Communication From a Counterpart Application, PCT Application No. PCT/CN2017/087803, English Translation of International Search Report dated Feb. 2, 2018, 3 pages.
Foreign Communication From a Counterpart Application, PCT Application No. PCT/CN2017/087803, English Translation of Written Opinion dated Feb. 2, 2018, 3 pages.

* cited by examiner

IMAGE CAPTURE METHOD AND APPARATUS

CROSS-REFERENCE TO RELATED APPLICATIONS

This application is a U.S. National Stage of International Patent Application No. PCT/CN2017/087803 filed on Jun. 9, 2017, which is hereby incorporated by reference in its entirety.

TECHNICAL FIELD

Embodiments of the present invention relate to the field of image processing technologies, and in particular, to an image capture method and apparatus.

BACKGROUND

Generally, different objects included in a scene may have different brightness. Especially at night, different objects included in the scene are greatly different in brightness. For example, the scene includes the night sky, a neon lamp, a building, a lamp mark in the building, and the like. The neon lamp and the lamp mark have relatively great brightness, but the sky and the building have relatively low brightness. In other words, different objects are greatly different in brightness.

In the prior art, when a scene is captured, a single exposure parameter is used for the panorama. Consequently, objects with different brightness in the scene cannot be clearly displayed in this manner. For example, the scene includes a building and a neon lamp. If a single exposure parameter is set for a panorama based on a brightness value of the neon lamp, a relatively small exposure parameter is used to avoid overexposure of the neon lamp. However, for the building, if the small exposure parameter is used, the building cannot be clearly displayed in a finally captured image.

It can be learned that a relatively clear captured image may not be obtained in some capture scenes if a single exposure parameter is used in the existing capture method.

SUMMARY

Embodiments of the present invention provide an image capture method and apparatus, to improve a definition of a captured image.

According to a first aspect, an embodiment of the present invention provides an image capture method. The method may be implemented by using a device capable of implementing image capture, such as a camera, a smartphone, or a tablet computer. The method includes: when capturing an image, obtaining, by an image capture device, a preview image in a capture preview window; segmenting, by the image capture device, the preview image into N image blocks based on N objects included in the preview image, where N is a positive integer; adjusting, by the image capture device, an exposure parameter of an image block of N image blocks, whose definition does not meet a preset definition criterion, until the definition of each image block meets the preset definition criterion; outputting, by the image capture device, prompt information used to prompt a user to capture the image; and receiving, by the image capture device, a capture instruction entered by the user, and capturing the preview image in the capture preview window based on the adjusted exposure parameter.

According to this embodiment of the present invention, the image capture device segments the preview image into the N image blocks based on the N objects included in the preview image, and the image capture device may capture and control different image blocks by using different exposure parameters. In addition, the image capture device may adjust an exposure parameter of an image block whose definition does not meet the preset definition criterion, until the image block meets the preset definition criterion, so that each object in a finally captured image can be clearly displayed, thereby improving quality of the captured image.

In a possible design, before the segmenting, by the image capture device, the preview image into N image blocks based on N objects included in the preview image, the method further includes: processing, by the image capture device, the preview image by using an edge detection algorithm, and determining an edge contour of a region of each of the N objects included in the preview image to obtain N edge contours; and determining, by the image capture device, the N objects from the N edge contours based on characteristic information of each object.

According to this embodiment of the present invention, the image capture device determines the N objects in the preview image by using the edge detection algorithm, and then segments the preview image into the N image blocks based on the N objects, so as to avoid that edges between different image blocks are not clearly displayed, thereby improving quality of the finally captured image.

In a possible design, the adjusting, by the image capture device, an exposure parameter of each of the M image blocks until the definitions of the M image blocks meet the preset definition criterion includes: obtaining, by the image capture device, a current exposure parameter of a first image block of the M image blocks, where the current exposure parameter is an exposure parameter used to obtain the first image block in the preview image; and adjusting, by the image capture device, the current exposure parameter of the first image block based on a brightness value of the first image block until a definition of the first image block meets the preset definition criterion, where the first image block is any one of the M image blocks.

According to this embodiment of the present invention, when determining that an image block is unclear, the image capture device may adjust a current exposure parameter of the image block based on a brightness value of the image block, until the image block can be relatively clearly displayed, thereby improving quality of the finally captured image.

In a possible design, the adjusting, by the image capture device, the current exposure parameter of the first image block based on a brightness value of the first image block, until a definition of the first image block meets the preset definition criterion includes: if the brightness value of the first image block is less than a preset brightness value, increasing, by the image capture device, the current exposure parameter of the first image block until the definition of the first image block meets the preset definition criterion; or if the brightness value of the first image block is greater than the preset brightness value, decreasing, by the image capture device, the current exposure parameter of the first image block until the definition of the first image block meets the preset definition criterion.

According to this embodiment of the present invention, the image capture device may adjust the current exposure parameter of the image block based on the brightness value of the image block. For example, when the image block is excessively bright, the image capture device decreases the current exposure parameter of the image block, or when the image block is excessively dark, the image capture device increases the current exposure parameter of the image block. By using the method, the image block can be clearly displayed finally, thereby improving quality of the finally captured image.

In a possible design, the adjusting, by the image capture device, the current exposure parameter of the first image block based on a brightness value of the first image block until a definition of the first image block meets the preset definition criterion includes: in a process of adjusting, by the image capture device, the current exposure parameter of the first image based on the brightness value of the first image block, if a new object appears in the first image block, segmenting, by the image capture device based on P sub-objects included in the first image block in which the new object appears, the first image block in which the new object appears into P image sub-blocks, where P is a positive integer; determining, by the image capture device from the P image sub-blocks. Q image sub-blocks whose definitions do not meet the preset definition criterion, where Q is a positive integer less than or equal to P; and adjusting, by the image capture device, an exposure parameter of each of the Q image sub-blocks until the definitions of the Q image sub-blocks meet the preset definition criterion.

According to this embodiment of the present invention, in the process of adjusting the exposure parameter, the image capture device may continue to segment, into different image sub-blocks, an image block in which a new object appears. Then the image capture device continues to adjust an exposure parameter of an unclear image sub-block, so that each image sub-block can be clearly displayed, thereby improving quality of the finally captured image.

In a possible design, after the adjusting, by the image capture device, an exposure parameter of the M image blocks, the method further includes: sorting, by the image capture device, the N image blocks based on brightness values of the N image blocks; and the outputting, by the image capture device, prompt information used to prompt a user to capture the image includes: if a sorting result is the same as a prestored sorting result, outputting, by the image capture device, the prompt information used to prompt the user to capture the image.

According to this embodiment of the present invention, even though the image capture device adjusts the exposure parameter of the image block, it can still be ensured that a sorting result obtained based on the brightness values of the image blocks is kept unchanged. For example, the prestored sorting result is used to indicate a sorting result of sorting all the objects in the real scene based on the brightness values, and therefore by using the method, it can be ensured that the sorting result obtained based on the brightness values of all the objects in the finally captured image can relatively correctly reflect a real case.

In a possible design, the characteristic information includes a brightness value and/or color information of an object.

According to this embodiment of the present invention, the characteristic information may be other information, and the foregoing content is merely an example. This is not specifically limited in this embodiment of the present invention.

In a possible design, the exposure parameter includes an exposure time and/or an exposure strength.

According to this embodiment of the present invention, the exposure parameter may further include another parameter, and the foregoing content is merely an example. This is not specifically limited in this embodiment of the present invention.

According to a second aspect, an embodiment of the present invention further provides an image capture apparatus. The image capture apparatus has functions of the image capture device that implements the foregoing method design. These functions may be implemented by using hardware, or may be implemented by executing corresponding software by hardware. The hardware or software includes one or more units corresponding to the foregoing functions.

In a possible design, a specific structure of the image capture apparatus may include an image obtaining unit, an image segmentation unit, an exposure adjustment unit, and an image capture unit. These units can execute corresponding functions in the first aspect or any one of the possible designs of the first aspect.

According to a third aspect, an embodiment of the present invention further provides an image capture apparatus. The image capture apparatus has functions of the image capture device that implements the foregoing method design. These functions may be implemented by using hardware. The image capture apparatus includes a memory, configured to store computer executable program code, and a processor, where the processor is coupled with the memory. The program code stored in the memory includes an instruction. When the processor executes the instruction, the instruction causes the image capture apparatus to execute the method executed by the image capture device in the first aspect or any possible designs of the first aspect.

According to a fourth aspect, an embodiment of the present invention further provides a computer readable storage medium. The computer readable storage medium stores an instruction, and when the instruction runs on a computer, the computer executes the image capture method in the first aspect.

According to a fifth aspect, an embodiment of the present invention provides a computer program product including an instruction. When the product runs on a computer, the computer executes the image capture method in the first aspect.

According to the embodiments of the present invention, the image capture device segments the preview image into the N image blocks based on the N objects included in the preview image, and the image capture device may capture and control different image blocks by using different exposure parameters, which is performed at a relatively fine granularity. In addition, the image capture device may adjust an exposure parameter of an image block whose definition does not meet the preset definition criterion, until the image block meets the preset definition criterion, so that each object in the finally captured image can be clearly displayed, thereby improving quality of the captured image.

DESCRIPTION OF EMBODIMENTS

Figure 1:
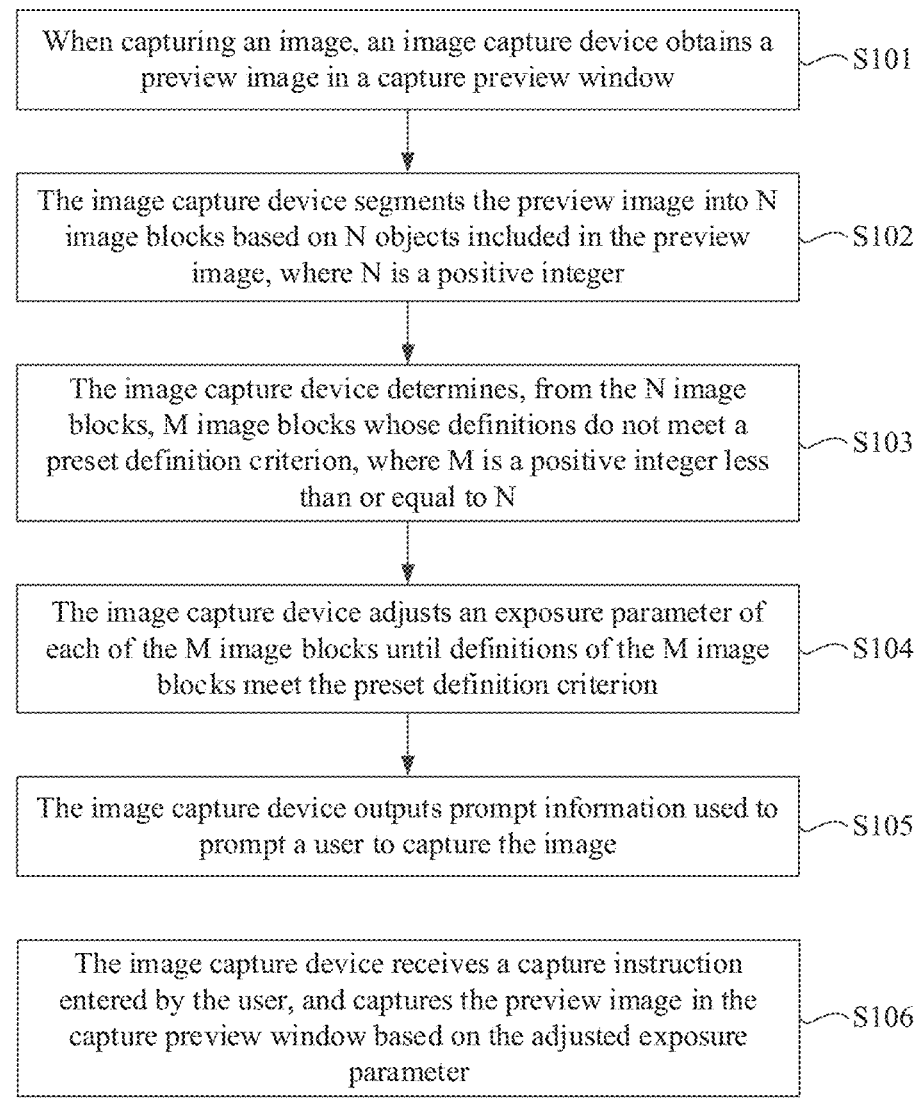
FIG. 1 is a flowchart of an image capture method according to an embodiment of the present invention.

The following clearly and completely describes the technical solutions provided in the embodiments of the present invention with reference to the accompanying drawings in the embodiments of the present invention.

The following describes some terms in the embodiments of the present invention, so as to help persons skilled in the art have a better understanding.

(1) An exposure parameter is a parameter that is set for image capture. The exposure parameter may be used to indicate a total amount of light sent out by a scene and received by a device when the device captures the scene. The exposure parameter may include an exposure time and/or an exposure strength, and the like.

Generally, a value of the exposure parameter may determine a brightness value of a finally captured image. For example, in a case of a long exposure time or a large exposure strength, there is a relatively large amount of admitted light when the device captures an image. Therefore, the captured image has relatively high brightness. In a case of a short exposure time or a small exposure strength, there is a relatively small amount of admitted light when the device captures an image. Therefore, the captured image has relatively low brightness.

(2) A preview image is an image presented in a capture preview window of a device before the device captures the image. A user views the preview image to obtain a capture effect, and if the user is satisfied with the capture effect of the preview image, the user may tap a "Capture" button to capture the image.

(3) The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects unless specified otherwise. In the description of the embodiments of the present invention, terms such as "first" and "second" are only used to distinguish the purpose of the description, but cannot be understood as indication or implication of relative importance, and cannot be understood as an indication or implication of a sequence.

The following describes an image capture method used when an existing device captures an image.

In a process of capturing the image, the existing device uses a single exposure parameter for a panorama. In other words, a same exposure parameter value is used for all objects in a real scene. Actually, objects with different brightness in the scene cannot be clearly displayed in this manner. For example, the scene includes a building and a neon lamp. If a single exposure parameter is set for a panorama based on a brightness value of the neon lamp, a relatively small exposure parameter is used to avoid overexposure of the neon lamp. However, for the building, if the small exposure parameter is used, the building cannot be clearly displayed in the finally captured image. It can be learned that a relatively clear captured image may not be obtained in some capture scenarios by using the existing image capture method.

To resolve the technical problem, an embodiment of the present invention provides a new image capture method. An image capture device segments a preview image into different image blocks, and each image block is corresponding to one object. The image capture device may set exposure parameters for different image blocks, that is, control the different image blocks, which is performed at a relatively fine granularity. The image capture device may adjust an exposure parameter of an image block whose definition does not meet a preset definition criterion, so that an object included in each image block can be displayed relatively clearly. This can improve quality of a captured image.

FIG. 1 is a flowchart of an image capture method according to an embodiment of the present invention. The method may be implemented by using a device with an image capture capability. The device is referred to as an image capture device in the following content. The device may be a mobile phone, a tablet computer (PAD), a camera, or the like. A procedure of the method is described as follows.

S101. When capturing an image, an image capture device obtains a preview image in a capture preview window.

When a user captures the image by using the image capture device, the user may turn on a camera on the image capture device, to collect a scene desired by the user. In this case, a preview image of the scene collected by the camera is presented in the preview window of the image capture device, and the user views the preview image to obtain a capture effect of the scene.

Before the image capture device obtains the preview image, an initial exposure parameter is usually set, that is, an initial value of the exposure parameter is set. Then the image capture device collects a panorama by using the initial exposure parameter to obtain the preview image. In other words, the same initial value of the exposure parameter is used for the entire preview image. The initial value of the exposure parameter may be manually set by the user by experience, or may be automatically set by the image capture device. For example, the image capture device may use an exposure parameter value that is used to capture an image last time as the initial value to obtain the preview image.

S102. The image capture device segments the preview image into N image blocks based on N objects included in the preview image, where N is a positive integer.

In this embodiment of the present invention, after obtaining the preview image, the image capture device may determine the N objects included in the preview image. Then, the image capture device segments the preview image into the N image blocks based on the N objects included in the preview image. The image capture device may use a plurality of manners to determine the N objects included in the preview image, for example, an edge detection algorithm or a line segment detector. This is not specifically limited in the present invention.

The edge detection algorithm is used as an example. An implementation process of S102 may be divided into three steps. Step 1: Determine an edge contour of a region of each object to obtain N edge contours. Step 2: Determine the N objects from the N edge contours based on characteristic information of each object. Step 3: Segment the preview image into the N image blocks. The following separately describes implementations of the three steps.

In step 1, the image capture device may process the preview image by using the edge detection algorithm, to preliminarily determine the edge contour of the region of each object.

The reason is that regions of different objects in an image have different change gradients. For example, there are two objects in an image, and the two objects are located in two different regions of the image. The two regions have different change gradients, for example, the two regions have different grayscale value distributions or different texture structures. The image capture device may determine, by using the edge detection algorithm, the regions that have different change gradients in the preview image, and determine an edge contour of each region.

Actually in step 1, the image capture device can only determine the edge contour of the region of each object. However, the edge contour of the region may not be a real edge contour of the object. For example, if the two objects in the preview image have an approximately same grayscale value distribution, the image capture device classifies the two objects into one region by using the edge detection algorithm. In other words, the two objects are within a region encircled by one edge contour, that is, two objects are included within the one edge contour. Therefore, to determine whether there is only one object within one edge contour, in step 2, the image capture device may further determine the N objects from the N edge contours based on the characteristic information of each object.

In this embodiment of the present invention, the characteristic information of the object may include at least one of color information and a brightness value of the object, and certainly may include other characteristic information.

For example, one object is to be determined. In step 2, if determining that characteristic information within a region encircled by an edge contour is the same, the image capture device determines that an object encircled by the edge contour is one object, that is, the edge contour is a real edge contour of the object. If the image capture device determines that there is a sub-region whose characteristic information changes relatively abruptly within a region encircled by an edge contour, the image capture device may directly remove the sub-region whose characteristic information changes abruptly from the region encircled by the edge contour, and determine that an edge contour of a remaining sub-region is a real edge contour of one object. In addition, the image capture device may use an edge contour of the sub-region whose characteristic information changes abruptly as a real edge contour of another object.

After determining a real contour of each of the N objects in the preview image, the image capture device may perform step 3, that is, segment the preview image into the N image blocks. The N image blocks may be used to completely segment the entire preview image, so that the image capture device may process the entire preview image.

In this embodiment of the present invention, the image capture device determines the N objects in the preview image by using the edge detection algorithm, and then segments the preview image into the N image blocks based on the N objects, so as to avoid that edges between different image blocks are not clearly displayed, thereby improving quality of a finally captured image.

S103. The image capture device determines, from the N image blocks, M image blocks whose definitions do not meet a preset definition criterion, where M is a positive integer less than or equal to N.

In this embodiment of the present invention, S103 may be implemented in plurality of manners. For example, a Laplace variance algorithm or a wavelet transform algorithm may be used to determine a definition of each image block in the preview image.

In this embodiment of the present invention, the image capture device may set a standard definition value to determine whether each image block in the preview image is clear. All the image blocks may have a same standard definition value, that is, all the image blocks use one standard definition value. Alternatively, each image block may have a different standard definition value, that is, a respective standard definition value may be set for each image block. For example, the user may preset by experience a standard definition value for each image block, or the image capture device may preset a standard definition value for each image block. When a definition of an image block in the preview image is greater than or equal to the standard definition value of the image block, the image capture device determines that the image block in the preview image is clear. When a definition of an image block in the preview image is less than the standard definition value of the image block, the image capture device determines that the image block in the preview image is unclear.

For example, after obtaining the preview image by using the initial exposure parameter, the image capture device determines that the preview image includes four objects, and the image capture device segments the preview image into four image blocks. The image capture device further determines whether each image block is clear. If the image capture device determines that two image blocks are unclear and the other two image blocks are clear, the image capture device needs to adjust initial values of exposure parameters of the unclear image blocks.

S104. The image capture device adjusts an exposure parameter of each of the M image blocks until definitions of the M image blocks meet the preset definition criterion.

In this embodiment of the present invention, as mentioned above, a value of the exposure parameter may determine brightness of an image, and the brightness of the image affects a definition of the image. For example, if the image is excessively bright or excessively dark, the image cannot be clearly displayed. Therefore, when the image block is clear, it indicates that brightness of the image block is relatively appropriate. In other words, the initial exposure parameter is set relatively appropriate for the image block, and the initial exposure parameter does not need to be adjusted. When the image block is unclear, the reason may be that brightness of the image block is inappropriate. In other words, the image block may be excessively bright or excessively dark. If the image block is presented excessively dark, the initial value of the exposure parameter is set quite small for the image block. If the image block is presented excessively bright, the initial value of the exposure parameter is set quite large for the image block. Therefore, the image capture device may determine, according to brightness or darkness of the image block, whether to decrease or increase the initial value of the exposure parameter.

In this embodiment of the present invention, the image capture device may set a different brightness threshold for each image block. When a brightness value of an image block is greater than a brightness threshold of the image block, the image capture device determines that the image block is excessively bright; or when a brightness value of an image block is less than a brightness threshold of the image block, the image capture device determines that the image block is excessively dark. Certainly, the image capture device may set a same brightness threshold for all the image blocks. The brightness threshold herein may be set by the user by experience, or may be automatically set by the image capture device.

If the image block is excessively bright, the image block is overexposed. An overexposed image block cannot be clearly displayed because the image block is exposed to too much light. In other words, the initial value of the exposure parameter is set quite large for the image block, and the image capture device may decrease the initial value of the exposure parameter. If the image block is excessively dark, the image block is underexposed. An underexposed image block cannot be clearly displayed because the image block is exposed to insufficient light. In other words, the initial value of the exposure parameter is set quite small for the image block, and the image capture device may increase the initial value of the exposure parameter.

In this embodiment of the present invention, to make a value of an adjusted exposure parameter is relatively accurate, the image capture device may set an adjustment amplitude used for adjusting the exposure parameter each time. For example, the exposure parameter is an exposure time, and an adjustment amplitude for adjusting the exposure time each time may be 0.5 ms. The adjustment amplitude of the exposure parameter may be set to a relatively small value, so that a value of the exposure parameter adjusted by the image capture device is relatively accurate.

In this embodiment of the present invention, the image capture device may skip determining whether an unclear image block is excessively bright or excessively dark. The reason is that, if the image capture device obtains the preview image by using a relatively small initial value of the exposure parameter, each image block in the preview image obtained by the image capture device has relatively low brightness, and no image block is excessively bright. In this case, when the image block is unclear, it does not need to determine whether the image block is excessively bright or excessively dark. The image capture device determines that the image block is excessively dark by default. Therefore, in this case, the image capture device directly increases the initial value of the exposure parameter. Likewise, if the image capture device obtains the preview image by using a relatively large initial value of the exposure parameter, each image block in the preview image obtained by the image capture device has relatively high brightness, and no image block is excessively dark. In this case, when an image block is unclear, it does not need to determine whether the image block is excessively bright or excessively dark, and the image capture device determines that the image block is excessively bright by default. Therefore, in this case, the image capture device directly decreases the initial value of the exposure parameter.

Certainly, if the image capture device obtains the preview image by using an initial value of the exposure parameter that is set arbitrarily, when there is an unclear image block in the preview image, the image capture device still needs to determine whether the image block is excessively bright or excessively dark.

In this embodiment of the present invention, if the initial exposure parameter is inappropriate to an image block, when the image capture device adjusts the initial exposure parameter, a new object may appear in the image block. The reason is that when the initial value of the exposure parameter is inappropriate, a quantity of objects in the obtained preview image may be less than a quantity of objects in a real scene. In other words, there may be another object in regions encircled by edge contours of some objects in the preview image. However, due to the inappropriate initial exposure parameter, these objects cannot be displayed in the preview image, and the image capture device cannot identify them. One image block is used as an example. If the initial value of the exposure parameter is set relatively small for the image block, that is, the entire image block is displayed excessively dark, the image capture device cannot continue to segment the image block. However, the image block may include more than one object actually, but the image capture device cannot identify another object in the image block because the initial value of the exposure parameter is relatively small. On the contrary, if the initial value of the exposure parameter is set relatively large for the image block, that is, the image block is displayed excessively bright overall, the image capture device cannot continue to segment the image block. However, the image block may include more than one object actually, but the image capture device cannot identify another object in the image block either because the initial value of the exposure parameter is quite large.

In a possible implementation, after adjusting the value of the exposure parameter each time, the image capture device may obtain a new preview image by using an adjusted value of the exposure parameter, and segment the new preview image into different image blocks. In other words, after adjusting the value of the exposure parameter each time, the image capture device may perform S101 and S102 again. For an image block that can be clearly displayed in an original preview image (the preview image obtained by using a value of an exposure parameter that is before adjustment), because the image capture device does not change the value of the exposure parameter of the image block, the image block can still be displayed in the new preview image. Even though the image capture device segments the new preview image, the image capture device still uses the image block as a separated image block, and does not segment the image block into different image sub-blocks. However, for an image block that cannot be clearly displayed in the original preview image, because the image capture device adjusts a value of an exposure parameter of the image block, a new object may be displayed in the image block. Therefore, when segmenting a new preview image, the image capture device may segment the image block into different image sub-blocks.

In this embodiment of the present invention, after the initial exposure parameter is adjusted, a new object may appear in some image blocks. The image capture device segments, based on P sub-objects included in an image block in which the new object appears, the image block in which the new object appears into P image sub-blocks, where P is a positive integer. For the P image sub-blocks, S103 and S104 may be repeated. In other words, the image capture device determines, from the P image sub-blocks, Q image sub-blocks whose definitions do not meet the preset definition criterion, where Q is a positive integer less than or equal to P. Then, the image capture device adjusts an exposure parameter of each of the Q image sub-blocks until the definitions of the Q image sub-blocks meet the preset definition criterion.

Figure 2:
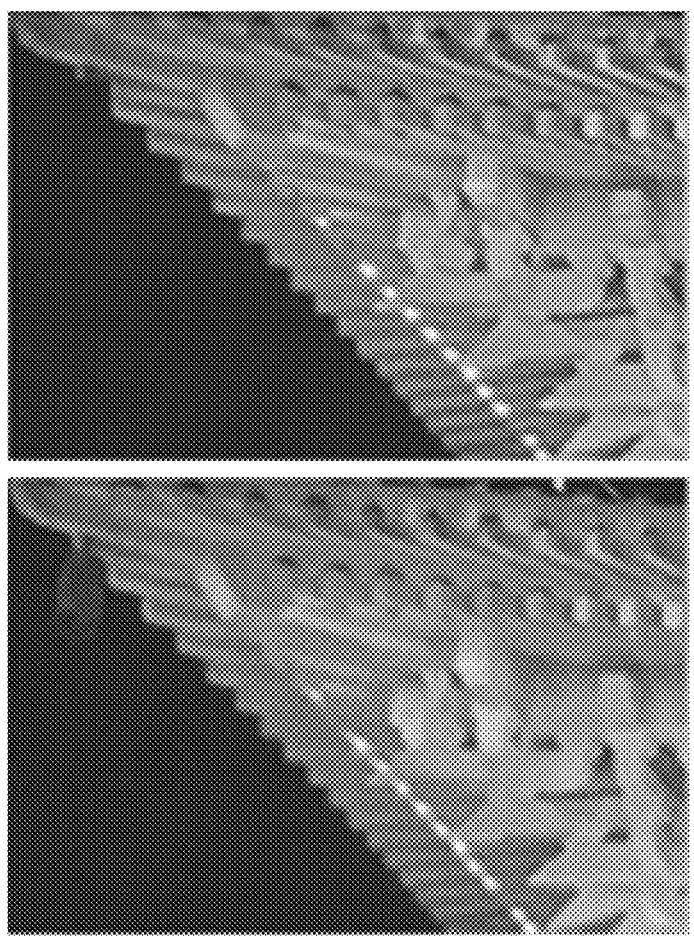
FIG. 2 is a comparison diagram of preview images according to an embodiment of the present invention.

For example, the exposure parameter is an exposure time. The user wants to capture a scene at night, and the scene actually includes the sky, a lantern, and eaves. The image capture device uses a relatively short exposure time when obtaining the preview image, and therefore not all objects included in the scene can be clearly displayed in the preview image. For example, referring to a first image in FIG. 2, the preview image includes only two objects: the sky and the eaves, and the image capture device segments the preview image into two image blocks. The image capture device determines, through determining, that the sky in the preview image is unclear but the eaves are clear. In this case, the image capture device determines that an initial exposure time is relatively appropriate for the eaves but is inappropriate for the sky. The image capture device determines that the sky in the preview image is excessively dark, and therefore increases an exposure time of the sky in the preview image. As the exposure time increases, a new object may appear in a region of the sky in the preview image, referring to a second image in FIG. 2. The image capture device may segment an image block corresponding to the sky in the preview image into two image sub-blocks, that is, the sky and the lantern. In this case, the image capture device may continue to determine whether an image block corresponding to the lantern in the preview image is clear. If the image block is unclear, the image capture device may increase an exposure time of the image block corresponding to the lantern in the preview image until the lantern can be displayed relatively clearly.

In this embodiment of the present invention, the image capture device segments the preview image into different image blocks, and adjusts the current exposure parameter of the image block whose definition does not meet the preset definition criterion. In addition, after the current exposure parameter is adjusted, if a new object appears in an image block, the image capture device separates the new object through segmentation, and if the new object is unclear, continues to adjust an exposure parameter of the new object. By using the method, each object in the real scene can be relatively clearly displayed in the finally captured image.

In this embodiment of the present invention, after adjusting the exposure parameter each time, the image capture device may determine whether the exposure parameter is appropriately adjusted this time. The following describes a possible implementation for which the image capture device determines whether the exposure parameter is appropriately adjusted.

In this embodiment of the present invention, if the image capture device adjusts the current exposure parameter of the M unclear image blocks, the image capture device obtains new brightness values of M image blocks whose exposure parameters have been adjusted, and sorts all image blocks in the preview image based on the new brightness values to obtain a new sorting result. The image capture device compares a new sorting result and a prestored initial sorting result, and if the two results are consistent, the image capture device determines that the exposure parameter is appropriately adjusted this time.

The following describes two implementations of obtaining the initial sorting result by the image capture device.

Implementation 1: As mentioned above, the image capture device obtains the preview image by using the initial exposure parameter, the image capture device may determine an initial brightness value of each image block in the preview image, and sorts the N image blocks based on the initial brightness value to obtain the initial sorting result. Such a manner is easy to operate and easy to implement.

Implementation 2: The image capture device may obtain two preview images of a same scene based on different initial exposure parameters, sort N image blocks included in each preview image to obtain two sorting results, and then obtain a relatively accurate initial sorting result based on the two sorting results. In this manner, accuracy of the initial sorting result obtained by the image capture device can be improved.

For example, the image capture device may collect a scene based on an initial exposure parameter 1, obtain a preview image A, and determine that the preview image includes N objects, and the image capture device segments the preview image A into N image blocks. The image capture device sorts the N image blocks based on brightness values of the N image blocks to obtain a sorting result C. The image capture device may collect the same scene based on an initial exposure parameter 2, obtain a preview image B, and determine that the preview image includes M objects, and the image capture device segments the preview image B into M image blocks. The image capture device sorts the M image blocks based on brightness values of the M image blocks to obtain a sorting result D. Therefore, the image capture device may take a union set of M and N, to determine all image blocks included in the preview image. Then the image capture device takes a union set of C and D to determine a final sorting result.

As mentioned above, if the exposure parameter is not appropriately set, not all objects in the real scene can be displayed in the preview image, and therefore a quantity of objects included in the preview image A may be different from a quantity of objects included in the preview image B. Therefore, a quantity of image blocks included in the preview image A is different from a quantity of image blocks included in the preview image B, in other words. M may be different from N. For example, the scene actually includes two objects, one object is relatively bright and the other is relatively dark. If the initial exposure parameter 1 is less than the initial exposure parameter 2, only one object in the scene, namely, the relatively bright object, may be displayed in the preview image A. Two objects in the scene may be displayed in the preview image B, that is, both the bright object and the dark object are displayed. Therefore, to improve accuracy of the determined initial sorting result, the image capture device may respectively obtain two different preview images based on a relatively small exposure parameter and a relatively large exposure parameter, so that the finally determined initial sorting result can cover all objects in the real scene as far as possible.

For example, the image capture device determines that the preview image A includes four objects, and the image capture device segments the preview image A into four image blocks, for example, image blocks a, b, c, and d. The image capture device sorts the four image blocks based on the brightness values of the four image blocks in the preview image A, to obtain a sorting result a>b>c>d (it should be noted that, an object e is actually further included in the real scene, but the object e is not displayed in the preview image A. For example, the object e is actually included in a region of the object d, and the sorting result herein is actually a>b>c>d=e). The image capture device determines that the preview image B includes five objects, and the image capture device segments the preview image B into five image blocks, for example, image blocks a, b, c, d, and e. The image capture device sorts the five image blocks based on brightness values of the five image blocks in the preview image B to obtain a sorting result a>b>c>d>e. The image capture device takes a union set of the two sorting results to obtain a final sorting result a>b>c>d≥e. The sorting result may be used as the initial sorting result, and image capture device may store the sorting result for subsequent use.

Such a manner of determining whether the exposure parameter is appropriately adjusted is implemented based on an entire effect of an image. For example, the real scene includes a neon lamp and a road lamp, and the neon lamp is far bright than the road lamp. After the initial value of the exposure parameter is adjusted, if the road lamp in the preview image is brighter than the neon lamp, this is inconsistent with a real case. Therefore, in this manner, a finally captured image can relatively correctly reflect the real case of the scene.

The image capture device determines whether the exposure parameter is appropriately adjusted, and obtains two results: the exposure parameter is appropriate or inappropriate. For example, the image capture device has adjusted the initial value of the exposure parameter for a plurality of times. If the image capture device determines that an exposure parameter of an image block is inappropriately adjusted, further adjustment causes inconsistency between the entire image and the real case of the scene. Therefore, the image capture device may restore a value of the exposure parameter of the image block to a value of the exposure parameter that is before last adjustment, and end adjustment of the value of the exposure parameter of the image block. If the image capture device determines that a value of an exposure parameter of an image block is appropriately adjusted, the entire image is relatively consistent with the real case of the scene after the value of the exposure parameter of the image block is adjusted. To make the image block clear as far as possible, the image capture device continues to determine whether the image block is clear. If the image block is unclear, the image capture device continues to adjust the exposure parameter of the image block until the image block is clear, or until the image capture device determines that the exposure parameter of the image block is inappropriately adjusted. Then, the image capture device ends a process of adjusting the exposure parameter.

S105. The image capture device outputs prompt information used to prompt a user to capture the image.

In this embodiment of the present invention, after completing adjusting the exposure parameter, the image capture device may output the prompt information used to prompt the user to capture the image. The prompt information may be set in a plurality of manners, for example, a green line is displayed in the preview image. This is not specifically limited in the present invention.

S106. The image capture device receives a capture instruction entered by the user, and captures the preview image in the capture preview window based on the adjusted exposure parameter.

In this embodiment of the present invention, the user may enter the capture instruction in a plurality of manners, for example, tap a "Capture" button or control capture by using a voice. This is not specifically limited in the present invention.

In conclusion, in this embodiment of the present invention, the image capture device segments the preview image into the N image blocks based on the N objects included in the preview image. The image capture device may capture and control different image blocks by using different exposure parameters, which is performed at a relatively fine granularity. In addition, the image capture device may adjust an exposure parameter of an image block whose definition does not meet the preset definition criterion, until the image block meets the preset definition criterion. Further, after a value of the exposure parameter is adjusted, if a new object appears in an image block, the image capture device separates the new object through segmentation, and if the new object is unclear, continues to adjust an exposure parameter of the new object. According to the image capture method provided in this embodiment of the present invention, each object in a real scene can be relatively clearly displayed in the finally captured image, thereby improving quality of the captured image.

The following describes devices provided in the embodiments of the present invention with reference to the accompanying drawings.

Figure 3:
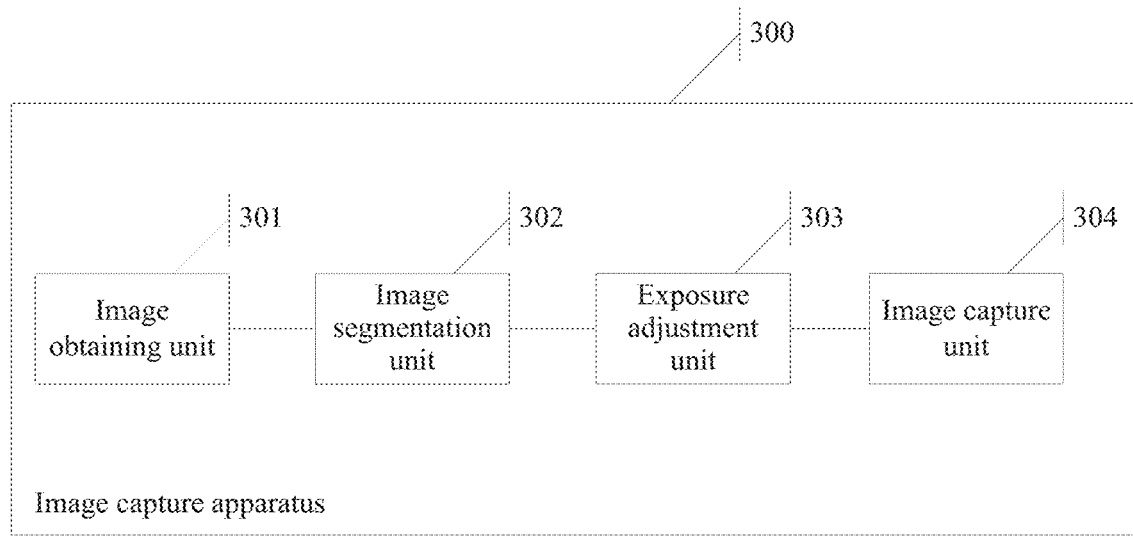
FIG. 3 is a schematic structural diagram of an image capture apparatus according to an embodiment of the present invention.

FIG. 3 is a schematic structural diagram of an image capture apparatus 300. The image capture apparatus 300 can implement functions of the foregoing image capture device. The image capture apparatus 300 may include an image obtaining unit 301, an image segmentation unit 302, an exposure adjustment unit 303, and an image capture unit 304. The image obtaining unit 301 may be configured to execute S101 in the embodiment shown in FIG. 1 and/or other processes of the technology described in this specification. The image segmentation unit 302 may be configured to execute S102 in the embodiment shown in FIG. 1 and/or other processes of the technology described in this specification. The exposure adjustment unit 303 may be configured to execute S103 and S104 in the embodiment shown in FIG. 1 and/or other processes of the technology described in this specification. The image capture unit 304 may be configured to execute S105 and S106 in the embodiment shown in FIG. 1 and/or other processes of the technology described in this specification. All related content of each step in the foregoing method embodiments may be cited in function descriptions of a corresponding functional module. Details are not described herein again.

It should be noted that in this embodiment, the image capture apparatus is presented in functional units. Without being limited, the term "unit" used in this specification may be an application-specific integrated circuit (application-specific integrated circuit, ASIC) executing one or more software or firmware programs, an electronic circuit, a (shared or dedicated or group) processor and a memory, a combined logic circuit, and/or another appropriate component providing the function.

Figure 4:
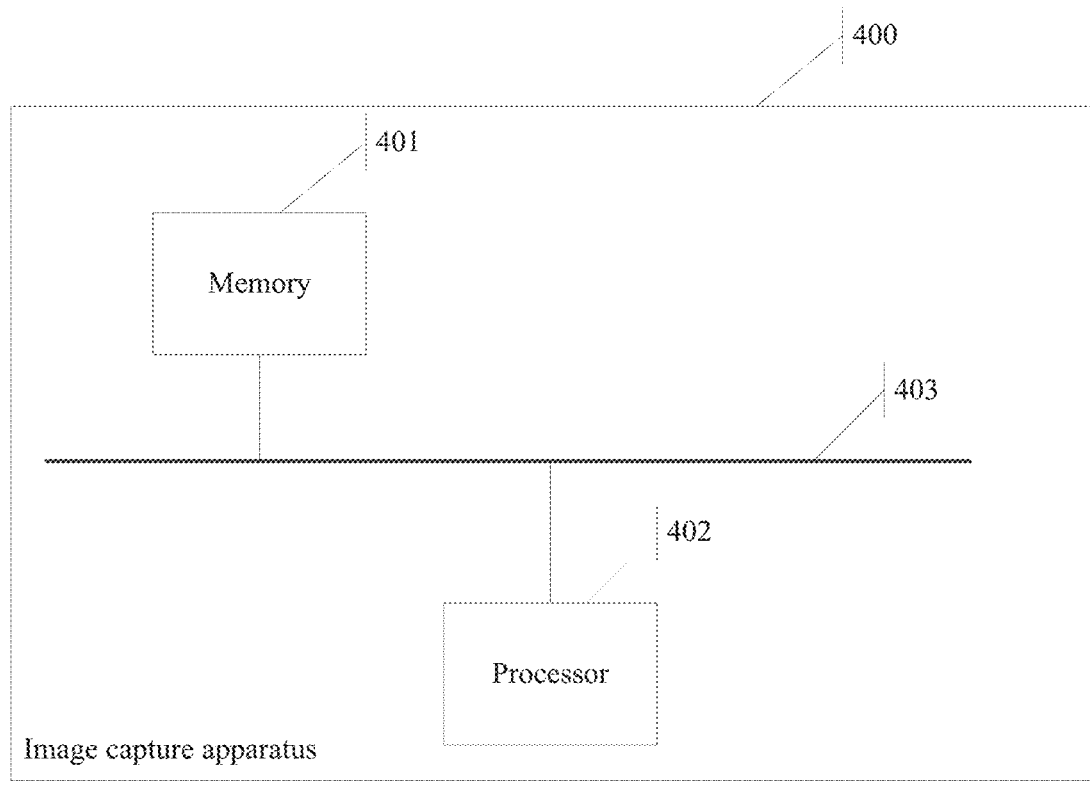
FIG. 4 is a schematic structural diagram of another image capture apparatus according to an embodiment of the present invention.

In a simple embodiment, persons skilled in the art can figure out that the image capture apparatus 300 may be implemented by using a structure shown in FIG. 4.

As shown in FIG. 4, an image capture apparatus 400 may include a memory 401, a processor 402, and a bus 403. The memory 401 and the processor 402 can be connected by using the bus 403. The memory 401 is configured to store a computer executable instruction, and when the image capture apparatus 400 runs, the processor 402 executes the computer executable instruction stored in the memory 401, so that the image capture apparatus 400 executes the image capture method provided in the embodiment shown in FIG. 1. For a specific image capture method, refer to related descriptions in the foregoing content and the accompanying drawing. Details are not described herein again.

In this embodiment of the present invention, the processor 402 may be a field programmable gate array (field programmable gate array, FPGA), an application-specific integrated circuit (application-specific integrated circuit, ASIC), a system on chip (system on chip, SOC), a central processing unit (central processing unit, CPU), a network processor (network processor, NP), a digital signal processor (digital signal processor, DSP), a microcontroller unit (microcontroller unit, MCU), a programmable logic device (programmable logic device, PLD), or another integrated chip. The bus 403 may be a peripheral component interconnect (peripheral component interconnect, PCI) bus, an extended industry standard architecture (extended industry standard architecture, EISA) bus, or the like. The bus 403 may be classified into an address bus, a data bus, a control bus, and the like. For ease of indication, the bus is marked by using only one bold line in FIG. 4. However, it does not indicate that there is only one bus or only one type of bus.

In conclusion, the embodiments of the present invention provide the image capture method and the image capture apparatus. In the method, the image capture device segments the preview image into the N image blocks based on the N objects included in the preview image. The image capture device may capture and control different image blocks by using different exposure parameters, which is performed at a relatively fine granularity. In addition, the image capture device may adjust an exposure parameter of an image block whose definition does not meet the preset definition criterion, until the image block meets the preset definition criterion. Further, after the value of the exposure parameter is adjusted, if the new object appears in the image block, the image capture device separates the new object through segmentation, and if the new object is unclear, continues to adjust the exposure parameter of the new object. According to the image capture method provided in the embodiments of the present invention, each object in the real scene can be relatively clearly displayed in the finally captured image, thereby improving quality of the captured image.

All or some of the foregoing embodiments in the present invention may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or another programmable apparatus. The computer instructions may be stored in a computer readable storage medium or may be transmitted from a computer readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

The foregoing embodiments are merely used to describe the technical solutions in the embodiments of the present invention. The foregoing embodiments are merely intended to help understand the method and core idea of the embodiments of the present invention, and shall not be construed as a limitation on this application. Any variation or replacement readily figured out by persons skilled in the art within the technical scope disclosed in the embodiments of the present invention shall fall within the protection scope of the embodiments of the present invention.

What is claimed is:

1. An image capture method, implemented by an image capture device, comprising:
    obtaining a preview image in a capture preview window;
    segmenting the preview image into N image blocks based on N objects in the preview image, wherein N is a positive integer;
    determining M image blocks from the N image blocks;
    determining first definitions of each of the M image blocks, wherein first definitions of the M image blocks do not meet a preset definition criterion, wherein the preset definition criterion comprises an indication that the image blocks can be clearly displayed, and wherein M is a positive integer less than or equal to N;
    obtaining a current exposure parameter of a first image block of the M image blocks, wherein the current exposure parameter is used to obtain the first image block;
    segmenting the first image block into P image sub-blocks when a new object appears in the first image block, wherein P is a positive integer;
    determining Q image sub-blocks from the P image sub-blocks, wherein second definitions of the Q image sub-blocks do not meet the preset definition criterion, and wherein Q is a positive integer less than or equal to P;
    adjusting the current exposure parameter of each of the Q image sub-blocks until the second definitions meet the preset definition criterion;
    outputting prompt information when the first definitions meet the preset definition criterion, wherein the prompt information prompts a user to capture the image;
    receiving, in response to the prompt information, a capture instruction from the user; and
    capturing, in response to the capture instruction, the preview image based on an adjusted exposure parameter.

2. The image capture method of claim 1, wherein before segmenting the preview image, the method further comprises:
    processing the preview image using a line segment detector;
    determining an edge contour of a region of each of the N objects to obtain N edge contours; and
    determining the N objects from the N edge contours based on characteristic information of each object.

3. The image capture method of claim 2, wherein the characteristic information comprises a brightness value and a color of each object.

4. The image capture method of claim 1, wherein adjusting the current exposure parameter comprises:
    increasing the current exposure parameter when the brightness value is less than a preset brightness value; and
    decreasing the current exposure parameter when the brightness value is greater than the preset brightness value.

5. The image capture method of claim 1, wherein after adjusting the exposure parameter, the method further comprises sorting the N image blocks based on brightness values, and wherein outputting the prompt information further comprises outputting the prompt information when a sorting result is the same as a prestored sorting result.

6. The image capture method of claim 1, wherein the exposure parameter comprises an exposure time.

7. The image capture method of claim 1, wherein the exposure parameter comprises an exposure strength.

8. An electronic device, comprising:
    a non-transitory memory configured to store instructions; and
    a processor coupled to the non-transitory memory, wherein the instructions, when executed by the processor, cause the electronic device to:
        obtain a preview image in a capture preview window;
        segment the preview image into N image blocks based on N objects in the preview image, wherein N is a positive integer;
        determine M image blocks from the N image blocks;
        determine first definitions of each of the M image blocks, wherein first definitions of the M image blocks do not meet a preset definition criterion, wherein the preset definition criterion comprises an indication that the image blocks can be clearly displayed, and wherein M is a positive integer less than or equal to N;

obtain a current exposure parameter of a first image block of the M image blocks, wherein the current exposure parameter is used to obtain the first image block;

segment the first image block into P image sub-blocks when a new object appears in the first image block, wherein P is a positive integer;

determine Q image sub-blocks from the P image sub-blocks, wherein second definitions of the Q image sub-blocks do not meet the preset definition criterion, and wherein Q is a positive integer less than or equal to P;

adjust the current exposure parameter of each of the Q image sub-blocks until the second definitions meet the preset definition criterion;

output prompt information when the first definitions meet the preset definition criterion, wherein the prompt information prompts a user to capture the image;

receive, in response to the prompt information, a capture instruction from the user; and capture, in response to the capture instruction, the preview image based on an adjusted exposure parameter.

9. The electronic device of claim 8, wherein the instructions further cause the electronic device to:
process the preview image using an edge detection algorithm;
determine an edge contour of a region of each of the N objects to obtain N edge contours; and
determine the N objects from the N edge contours based on characteristic information of each object.

10. The electronic device of claim 9, wherein the characteristic information comprises a brightness value and color of each object.

11. The electronic device of claim 8, wherein the instructions further cause the electronic device to:
increase the current exposure parameter when the brightness value is less than a preset brightness value; and
decrease the current exposure parameter when the brightness value is greater than the preset brightness value.

12. The electronic device of claim 8, wherein the instructions further cause the electronic device to:
sort the N image blocks based on brightness values of the N image blocks; and
output the prompt information when a sorting result is the same as a prestored sorting result.

13. The electronic device of claim 8, wherein the exposure parameter comprises an exposure time.

14. The electronic device of claim 8, wherein the exposure parameter comprises an exposure strength.

15. A computer program product comprising computer-executable instructions for storage on a non-transitory computer readable medium that, when executed by a processor, cause an image capture device to:

obtain a preview image in a capture preview window;

segment the preview image into N image blocks based on N objects in the preview image, wherein N is a positive integer;

determine M image blocks from the N image blocks;

determine first definitions of each of the M image blocks, wherein definitions of the M image blocks do not meet a preset definition criterion, wherein the preset definition criterion comprises an indication that the image blocks can be clearly displayed, and wherein M is a positive integer less than or equal to N;

obtain a current exposure parameter of a first image block of the M image blocks, wherein the current exposure parameter is used to obtain the first image block;

segment the first image block into P image sub-blocks when a new object appears in the first image block, wherein P is a positive integer;

determine Q image sub-blocks from the P image sub-blocks, wherein second definitions of the Q image sub-blocks do not meet the preset definition criterion, and wherein Q is a positive integer less than or equal to P;

adjust the current exposure parameter of each of the Q image sub-blocks until the second definitions meet the preset definition criterion;

output prompt information when the definitions meet the preset definition criterion, wherein the prompt information prompts a user to capture the image;

receive, in response to the prompt information, a capture instruction from the user; and capture, in response to the capture instruction, the preview image based on an adjusted exposure parameter.

16. The computer program product of claim 15, wherein the computer-executable instructions further cause the image capture device to:
process the preview image using an edge detection algorithm;
determine an edge contour of a region of each of the N objects to obtain N edge contours; and
determine the N objects from the N edge contours based on characteristic information of each object.

17. The computer program product of claim 15, wherein the computer-executable instructions further cause the image capture device to:
increase the current exposure parameter when the brightness value is less than a preset brightness value; and
decrease the current exposure parameter when the brightness value is greater than the preset brightness value.

18. The computer program product of claim 15, wherein the computer-executable instructions further cause the image capture device to determine image blocks using a Laplace variance algorithm.

19. The computer program product of claim 15, wherein the computer-executable instructions further cause the image capture device to determine image blocks using a wavelet transform algorithm.

20. The computer program product of claim 15, wherein the computer-executable instructions further cause the image capture device to determine image sub-blocks using a Laplace variance algorithm or a wavelet transform algorithm.

* * * * *